ELIZABETH H. MULDAUR.
Alphabet Blocks.
No. 140,722.                            Patented July 8, 1873.
  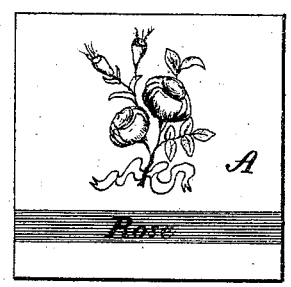
  
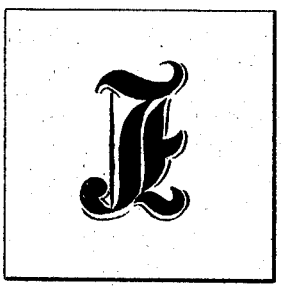 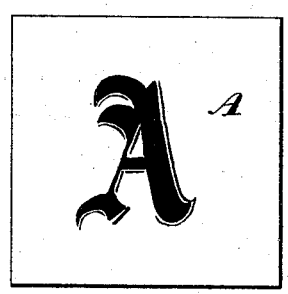 
Witnesses
W. Bradford
A. Ruppert
E. H. Muldaur
Inventor
D. P. Holloway & Co
Attorneys.
AM. PHOTO-LITHOGRAPHIC CO. N.Y. (OSBORNE'S PROCESS.)

UNITED STATES PATENT OFFICE.

ELIZABETH H. MULDAUR, OF DOVER, DELAWARE.

IMPROVEMENT IN ALPHABET-BLOCKS.

Specification forming part of Letters Patent No. 140,722, dated July 8, 1873; application filed April 28, 1873.

*To all whom it may concern:*

Be it known that I, ELIZABETH H. MULDAUR, of Dover, in the county of Kent and State of Delaware, have invented a certain Improvement in Toy Blocks, of which the following is a specification:

This invention relates to what are usually termed toy blocks, intended for little children, and so contrived as to both amuse and instruct them. My improvement consists in printing or otherwise forming pictures of animals, birds, or other objects upon the blocks, and forming beneath such pictures a dovetailed groove for the reception of a slide, upon which the name of the object represented above is printed. The slides having been separated from the blocks, the puzzle will consist in putting the several slides under the appropriate pictures.

The drawings represent several blocks, both in plan views and sections, constructed in accordance with my invention.

The blocks A can be made of any suitable material, and will be put up in boxes in the usual manner. Upon one side they contain the pictures of objects, underneath which a dovetailed groove, *a*, is cut in the block. The slides B are dovetailed to fit the grooves *a*, and printed upon the upper side of each is the name of an object represented by a picture upon one of the blocks. Upon the reverse side of the blocks are printed the letters of the alphabet, either as shown in the drawings or as described in my Letters Patent dated May 14, 1872, where part of each letter is printed upon a movable slide.

The letters of the alphabet may be omitted, and the reverse side of the blocks left blank; or pictures with removable name-slides may be formed upon both sides of the blocks.

What I claim as my invention, and desire to secure by Letters Patent, is—

An alphabet or toy block having a picture on one or more of its faces, and provided with a groove and a removable slide bearing the name of the object represented by said picture, substantially as shown and described.

In testimony whereof I have signed my name to this specification in the presence of two subscribing witnesses.

ELIZABETH H. MULDAUR.

Witnesses:
THOMAS D. MATHER,
HENRY E. KNAPP.